United States Patent
Jang et al.

(10) Patent No.: US 6,536,011 B1
(45) Date of Patent: Mar. 18, 2003

(54) ENABLING ACCURATE DEMODULATION OF A DVD BIT STREAM USING DEVICES INCLUDING A SYNC WINDOW GENERATOR CONTROLLED BY A READ CHANNEL BIT COUNTER

(75) Inventors: Eric Jang, Cupertino, CA (US); Arup K. Bhattacharya, Sunnyvale, CA (US); Chen-Chi Chou, Milpitas, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/176,853

(22) Filed: Oct. 22, 1998

(51) Int. Cl.[7] ............................................. G11B 29/00
(52) U.S. Cl. ................. 714/814; 369/53.34; 369/47.28; 714/775; 386/84; 386/126
(58) Field of Search ............................ 386/46, 84, 126, 386/2; 369/47–49, 53.34, 47.28; 360/51, 50, 26; 714/814, 798, 811, 819, 775

(56) References Cited

U.S. PATENT DOCUMENTS

| | | | |
|---|---|---|---|
| 4,727,530 A | * | 2/1988 | Tomisawa ................ 369/47.45 |
| 5,446,715 A | * | 8/1995 | Satomura ................. 386/124 X |
| 5,517,513 A | * | 5/1996 | Lee .............................. 714/798 |
| 5,677,935 A | * | 10/1997 | Karino ........................ 375/368 |
| 5,946,443 A | * | 8/1999 | Oh .............................. 386/46 |
| 5,963,705 A | * | 10/1999 | Kim et al. ............... 386/126 X |
| 6,263,469 B1 | * | 7/2001 | Jang ............................ 714/775 |

* cited by examiner

Primary Examiner—Aristotelis M Psitos
Assistant Examiner—Guy Lamarre
(74) Attorney, Agent, or Firm—Young Law Firm, P.C.

(57) ABSTRACT

A method of processing a DVD bitstream includes the steps of reading the DVD bitstream, the bitstream including a sync frame. A sync window is created, the sync window being open at least during the expected timing of a sync detection signal within the sync frame. The sync pattern is detected within the sync frame and the sync detection signal is generated only when the sync pattern has been detected and the sync window is open. A DVD sync pattern detection circuit includes a sync window generator to generate a sync window signal, a sync pattern detector, the sync pattern detector generating a sync detection signal only when both a sync pattern is detected in a DVD input stream and the sync window signal is asserted. A read channel bit counter generates a read counter signal to control the sync window generator, the read channel bit counter being reset when the sync pattern detector detects the sync pattern. The read channel bit counter controls the width of the sync window signals to allow the generation of correctly timed demodulation enable signals even when the sync frames have non-standard bit lengths. The sync windows also prevent the erroneous detection of sync patterns within the data portions of the sync frames. A pseudo sync detection signal is generated when the sync pattern is corrupted or missing from the sync frame.

26 Claims, 5 Drawing Sheets

ENABLING ACCURATE DEMODULATION OF A DVD BIT STREAM USING DEVICES INCLUDING A SYNC WINDOW GENERATOR CONTROLLED BY A READ CHANNEL BIT COUNTER

BACKGROUND OF THE INVENTION

1. Field of the Invention

This invention relates to devices and methods to process data from Digital Versatile Disks, or DVD. More particularly, the present invention relates to improved devices and methods for detecting synchronization patterns to enable accurate demodulation of a DVD bitstream.

2. Description of the Related Art

Figure 1:
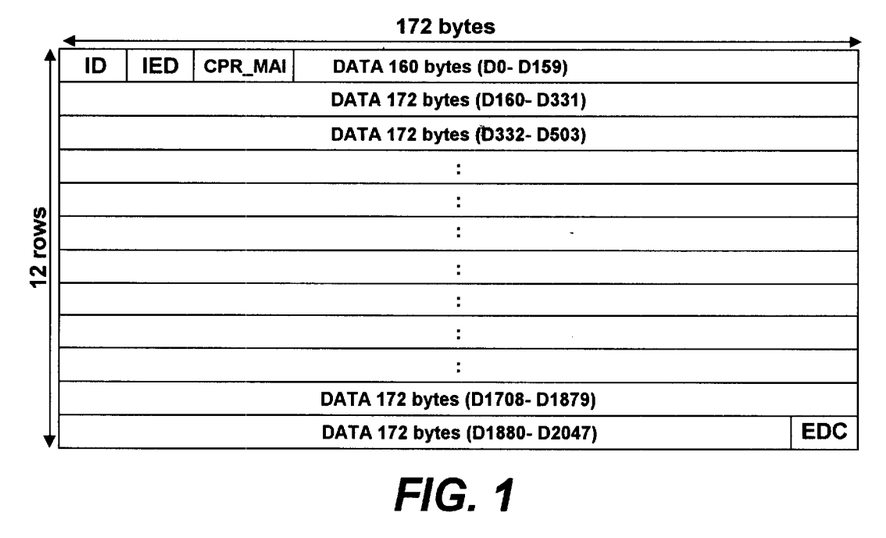
FIG. 1 shows the logical configuration of a data sector of a DVD-ROM or DVD-RAM disk.
Figure 2:
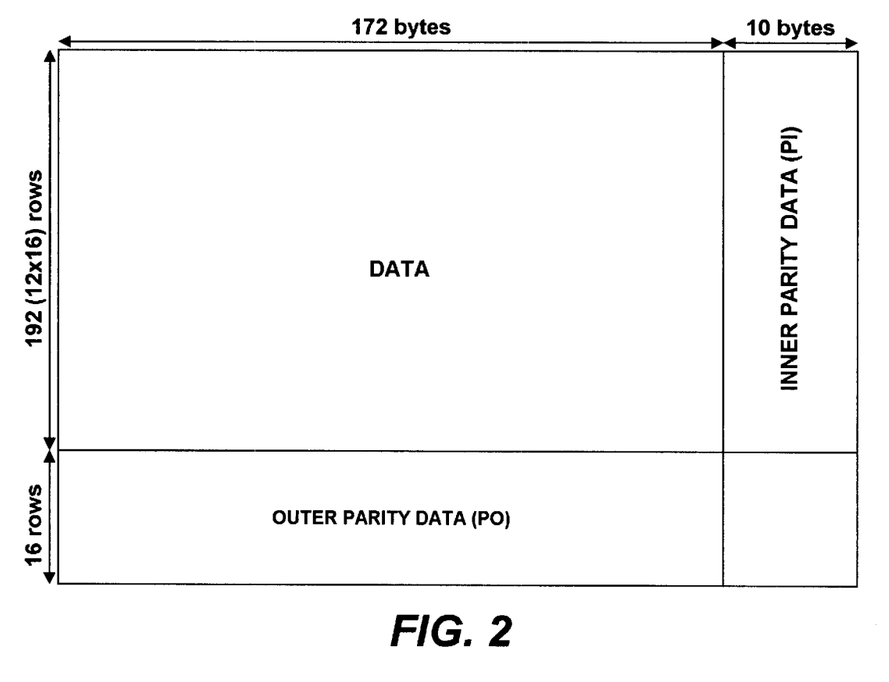
FIG. 2 shows the logical configuration of an ECC block, including outer code parity (PO) and inner code parity (PI).

A sector in a DVD is variously called a data sector, a recording sector or a physical sector, depending upon its configuration. FIG. 1 shows a data sector of a DVD disk. As shown in FIG. 1, a data sector includes 2048 bits of data, 4 bytes of identification (ID) data, 2 bytes of ID Error Detection code (IED), 6 bytes of Copyright Management Information (CPR_MAI) and 4 bytes of Error Detection Code (EDC). The 2048 bytes of data are then scrambled, using a feedback shift register. An ECC block is made up of 16 of the data sectors shown in FIG. 1. The 16 data sectors of the ECC block are then encoded, using Cross-Interleaved Reed-Solomon Code (CIRSC). An ECC block, including outer code parity (PO) and inner code parity (PI) is shown in FIG. 2. As shown in FIG. 2, 10 bytes of PI are added after each row, and one row of 182 bytes of PO are added after each of the 16 data sector of the ECC block, for a total of 16 rows of 182 bytes of PO data.

Figure 3:
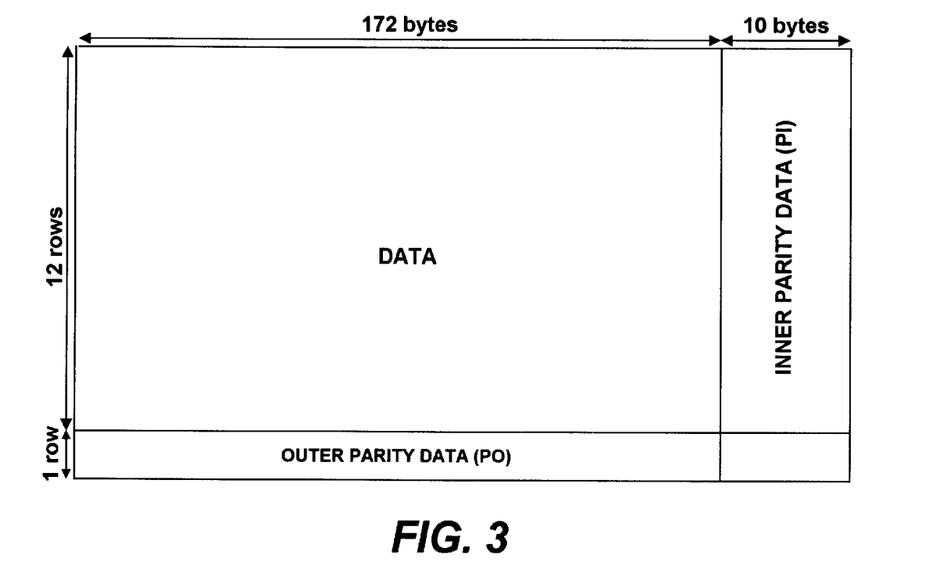
FIG. 3 shows the logical configuration of a recording sector of a DVD-ROM or DVD-RAM disk.

A recording sector is formed by interleaving the PO data in each of the 16 data sectors. One such recording sector is shown in FIG. 3. Each recording sector, therefore, includes a data sector consisting of 12 rows of 172 bites, each row having 10 bytes of PI data appended thereto. One row of 182 bytes of PO data is also included, as a result of the interleaving process referred to above.

Figure 4:
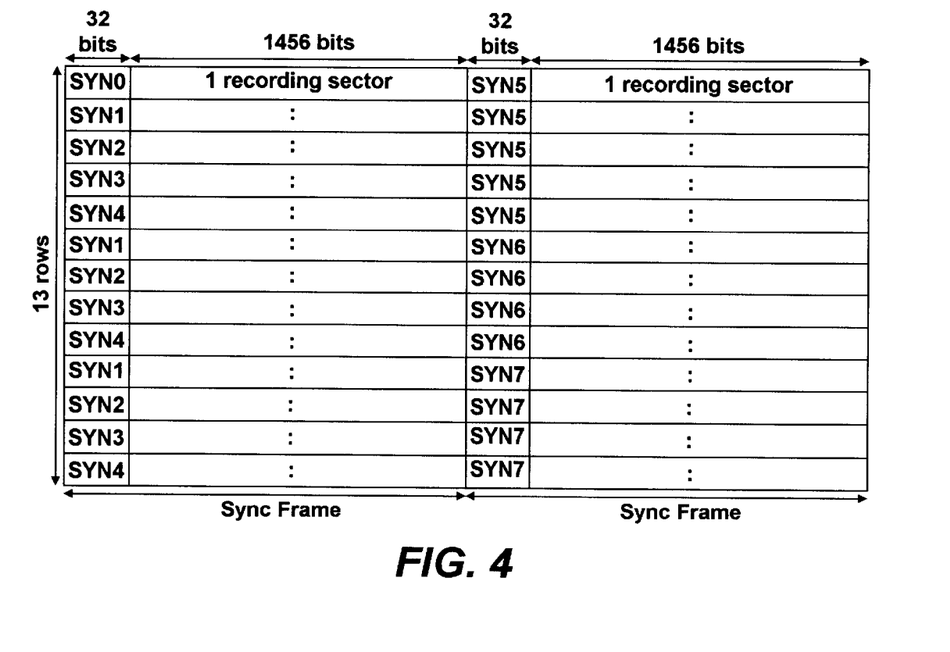
FIG. 4 shows the logical configuration of a physical sector, consisting of two sync frames, of a DVD-ROM or DVD-RAM disk.

Finally, a physical sector, according to the DVD specification, is formed by a two step process. First, an 8:16 modulation conversion is carried out, which effectively doubles the width of each sector. Then, 32 bits of frame synchronization information are prepended to each of the recording sectors in each row. A physical sector is shown in FIG. 4. As shown therein, each sync frame includes 4 bytes of synchronization information, each indicating the start of a recording sector, each recording sector consisting of 1456 bits, or 172 bytes of data and 10 bytes of PI information. Each synchronization code (hereafter "sync pattern") SYN0 to SYN7 is selected according to sync tables, not shown.

To access (e.g., to read or write) data from a DVD-ROM or DVD-RAM, a DVD read or read/write device must find the beginning of each physical sector. As shown in FIG. 4, only a single SYN0 bit pattern is included in each physical sector. To find the beginning of a physical sector, therefore, requires the DVD device to find the SYN0 bit pattern. To read the data encoded on the disk once the SYN0 pattern has been found, the DVD device must then demodulate the data portions of the recording sectors following the sync patterns SYN0 to SYN7. To demodulate the data portion of a sync frame, therefore, the end of the SYN0 pattern is typically detected, as shown in FIG. 5.

Figure 5:
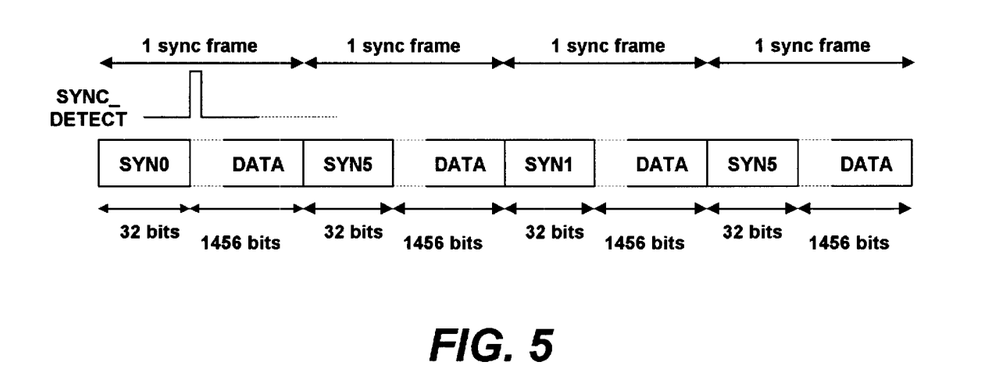
FIG. 5 is a timing diagram showing four sync frames of an input bitstream from a DVD, together with a SYNC_DETECT pulse indicating detection of a sync pattern.
Figure 6:
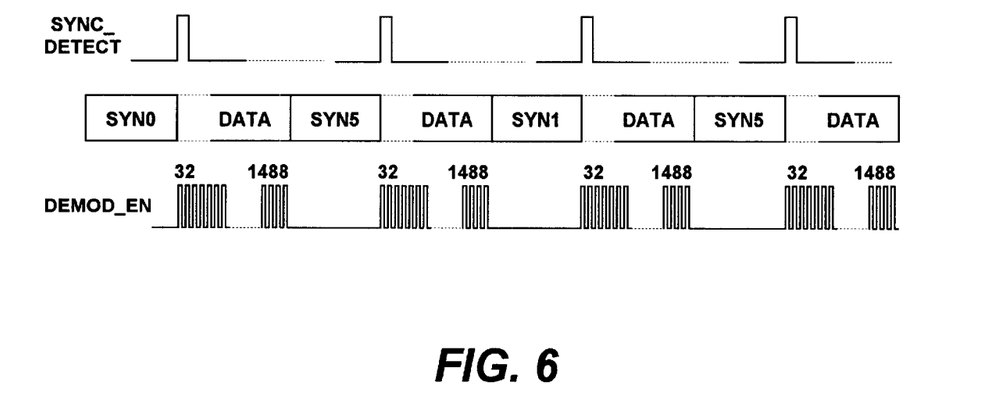
FIG. 6 is a timing diagram showing four sync frames of an input bitstream from a DVD, together with SYNC_DETECT pulses and demodulation enable pulses.

FIG. 5 shows a bit stream including four sync frames starting with SYN0, the beginning of a physical sector. After the SYN0 pattern is found, a SYNC_DETECT signal is typically generated and a bit stream counter is initialized at 32 and started. Whenever the four least significant bits (hereafter "LSB") are zero, a demodulation enable signal DEMOD_EN is generated, thus generating a DEMOD_EN signal every 16 bits. FIG. 6 illustrates the manner in which the DEMOD_EN are generated. The DEMOD_EN signals enable a 16:8 demodulation of the data previously having undergone the 8:16 modulation process referred to relative to FIG. 4. The bit stream counter is re-initialized to 0 after it reaches 1488, and the DEMOD_EN signals are again generated when the counter is between 32 and 1488, thus generating the DEMOD_EN pulses only within the 1456 bits of data within each sync frame of the physical sector while avoiding generating the demodulation signals DEMOD_EN within the sync patterns SYN1 through SYN7. Alternatively, a SYNC_DETECT pulse is generated upon detecting each sync pattern and the counter initialized to 32. The DEMOD_EN pulses are then generated when the bit stream counter is between 32 and 1488. Alternatively still, the bit stream counter may be initialized to zero each time the SYNC_DETECT signal is generated and count between 0 and 1489. The DEMOD_EN pulses are then generated when the counter is between 0 and 1455.

However, these demodulation schemes assume that each and every sync frame has exactly 1488 bits, that each sync pattern is exactly 32 bits in length and that the data portion of each sync frame is exactly 1456 bits in length. When these conditions do not hold, demodulation is no longer possible. For example, if any given sync pattern is not detected because of random noise or because it is corrupted or missing, for example, the bit stream counter will not be properly initialized, and demodulation of the data will be impossible. Also, if the length of the data portion of the sync frame is not exactly equal to 1456 bits, the demodulation enable signals DEMOD_EN will not properly parse the modulated sync frame data and the original 8-bit data will be unrecoverable for that sync frame. Such problems have conventionally rendered demodulation of data encoded on DVDs with corrupted, missing or unreadable sync patterns or sync frame data portions impossible.

Such demodulation schemes suffer from another disadvantage that, although occurring rather infrequently, nevertheless may render demodulation of the input data stream from the DVD impossible. Indeed, there is believed to be an approximately $1/10^5$ chance that random noise may result in one of the 32 bits read from a sync pattern to be in error, resulting in a mismatch of one of the sync patterns SYN0 to SYN7. Failure to properly detect the sync patterns SYN0 to SYN7 renders demodulation of the encoded data impossible. Sync patterns also may be falsely detected in the data portion of sync frames. Such an erroneous sync pattern detection will conventionally trigger the generation of a SYNC_DETECT pulse, as shown in FIGS. 5 and 6. Upon generation of such an erroneous SYNC_DETECT signal, the bit stream counter will be initialized, and the DEMOD_EN signals will be incorrectly generated through the next sync pattern, again rendering the demodulation of the encoded data impossible.

What are needed, therefore, are devices and methods of generating demodulating pulses for DVD data input bit-streams that are tolerant of missing and/or corrupted sync patterns and/or sync frame data portions of non-standard length. What are also needed are devices and methods for detecting sync pulses and facilitating demodulation of DVD data that are not affected by the sync pattern detection problems associated with conventional devices and methods.

SUMMARY OF THE INVENTION

The present invention, therefore, provides devices and methods for generating demodulating pulses for DVD data input bitstream that are tolerant of missing and/or corrupted sync patterns and/or sync frame data of non-standard length. The present invention also provides devices and methods for detecting sync pulses to enable accurate demodulation of DVD bitstream that are not affected by the sync pattern detection problems associated with conventional devices and methods.

In accordance with the principles of the invention above and those that will be mentioned and will become apparent below, a method of processing a DVD bitstream, according to an embodiment of the present invention, comprises the steps of:

reading the DVD bitstream, the bitstream including a sync frame;

creating a sync window, the sync window being open at least during an expected timing of a sync detection signal within the sync frame;

detecting the sync pattern within the sync frame; and generating the sync detection signal only when the sync pattern has been detected and the sync window is open.

According to further embodiments, in single-bit mode, the sync window may be open 2 bits before the expected timing of the sync detection signal and 2 bits after the generation of the sync detection signal. In dual bit mode, the sync window may be open 1 bit before the expected timing of the sync detection signal and 1 bit after the generation of the sync detection signal. In quad-bit mode, the sync window may be open only during the expected timing of the sync detection signal. A step of outputting a demodulation enable signal every 16 bits after generation of the sync detection signal until a sync frame boundary is encountered may also be carried out. A step of counting read channel bits of the DVD bitstream in a counter may also be carried out, as well as a step of resetting the counter upon generation of the sync detection signal and upon reaching the sync frame boundary. The resetting step preferably resets the counter to a value that accounts for a timing difference between the expected timing of the sync detection signal and a timing of the generation of the sync detection signal. A step of generating a pseudo sync detection signal after the sync window closes when no sync detection signal is generated during a time when the sync window is open may also be carried out.

The present invention may also be viewed as a DVD sync pattern detection circuit which, in one embodiment, comprises:

a sync window generator to generate a sync window signal;

a sync pattern detector, the sync pattern detector generating a sync detection signal only when both a sync pattern is detected in a DVD input stream and the sync window signal is asserted; and a read channel bit counter, the read channel bit counter generating a read counter signal to control the sync window generator and being reset when the sync pattern detector detects the sync pattern.

According to other embodiments, the sync window generator may further comprise means for generating a pseudo-sync signal, the pseudo-sync signal being generated when the sync pattern detector fails to detect a sync pattern when the sync window signal is asserted. A logic circuit coupled to the sync pattern detector and to the sync window generator may also be included, the logic circuit outputting a sync signal upon assertion of one of the pseudo-sync signal and the sync detection signal. The logic circuit may include an OR logic circuit. The read channel bit counter may include an 11-bit counter. The read channel bit counter may generate a demodulation enable signal during a data portion of a sync frame when a four least significant bits of the read channel bit counter are zero. The read counter signal preferably controls the width of the sync window signal. In single-bit mode, the sync window signal is preferably asserted 2 bits before the expected timing of the sync detection signal and de-asserted 2 bits after the generation of the sync detection signal. In dual-bit mode, the sync window signal is preferably asserted 1 bit before the expected timing of the sync detection signal and de-asserted 1 bit after the generation of the sync detection signal. In quad-bit mode, the sync window signal is preferably asserted only during the expected timing the sync detection signal.

The present invention, according to another embodiment thereof, is also a DVD controller, comprising:

means for reading a DVD bitstream;

means for generating a sync window signal;

means for detecting a sync pattern within the DVD bitstream, the sync pattern detecting means generating a sync detection signal only when both the sync pattern is detected and the sync window signal is asserted; and means for counting channel bits, the channel bit counting means generating a read counter signal to control the sync window generating means and resetting when the sync pattern detecting means detects the sync pattern.

According to still further embodiments, the sync window signal generating means may further comprise means for generating a pseudo-sync signal, the pseudo-sync signal being generated when the sync pattern detecting means fails to detect a sync pattern when the sync window signal is asserted. A logic circuit may be coupled to the sync pattern detecting means and to the sync window signal generating means, the logic circuit outputting a sync signal upon assertion of one of the pseudo-sync signal and the sync detection signal. The channel bit counting means may include means for generating a demodulation enable signal during a data portion of a sync frame when the four least significant bits of the read channel bit counting means are zero. The read counter signal preferably controls the width of the sync window signal. In single-bit mode, the sync window signal generating means preferably asserts the sync window signal 2 bits before the expected timing of the sync detection signal and de-asserts the sync window signal 2 bits after the generation of the sync detection signal. In dual-bit mode, the sync window signal generating means preferably asserts the sync window signal 1 bit before the expected timing of the sync detection signal and de-asserts the sync window signal 1 bit after the generation of the sync detection signal. In quad-bit mode, the sync window signal generating means preferably asserts the sync window only during an expected timing the sync detection signal.

The present invention may also be viewed as a DVD bitstream processing circuit, comprising:

a sync window signal generator;

a sync pattern detector to detect a sync pattern within a DVD bitstream, the sync pattern detector generating a sync detection signal only when both the sync pattern is detected and a sync window signal is asserted; and a channel bit counter, the channel bit counter generating a read counter signal to control the sync window signal generator and resetting when the sync pattern detector detects the sync pattern.

According to other embodiments, the sync window signal generator may further generate a pseudo-sync signal, the pseudo-sync signal being generated when the sync pattern detector fails to detect a sync pattern when the sync window signal is asserted. A logic circuit may also be coupled to the sync pattern detector and to the sync window signal generator, the logic circuit outputting a sync signal upon assertion of either the pseudo-sync signal or the sync detection signal. The channel bit counter may generate a demodulation enable signal during a data portion of a sync frame when the four least significant bits of the read channel bit counter are zero. The read counter signal may control the width of the sync window signal and, in single-bit mode, the sync window signal generator may assert the sync window signal 2 bits before the expected timing of the sync detection signal and de-assert the sync window signal 2 bits after the generation of the sync detection signal. The read counter signal may control the width of the sync window signal and, in dual-bit mode, the sync window signal generator may assert the sync window signal 1 bit before an expected timing of the sync detection signal and de-assert the sync window signal 1 bit after the generation of the sync detection signal. In quad-bit mode, the sync window signal generator may assert the sync window only during the expected timing the sync detection signal.

BRIEF DESCRIPTION OF THE DRAWINGS

For a further understanding of the advantages of the present invention, reference should be made to the following detailed description, taken in conjunction with the accompanying figures, in which.

DESCRIPTION OF THE INVENTION

Figure 7:
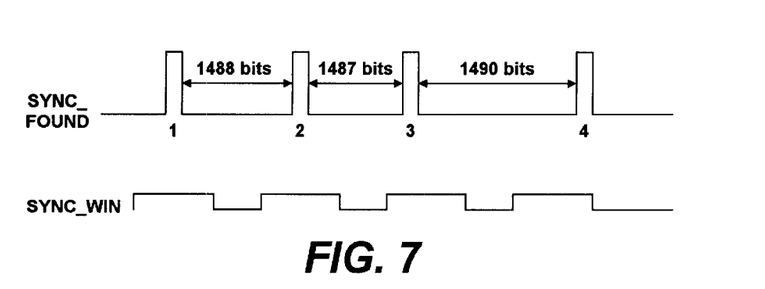
FIG. 7 is a timing diagram illustrating the operating principle of the method of detecting sync patterns according to the present invention.

An embodiment of the present invention is shown in FIG. 7. As shown therein, to avoid erroneously detecting false sync pattern in the data portion of sync frames, and to successfully demodulate sync frame data in sync frames having a bit length other than the standard length of 1488 bits, each sync pattern is only detected when a corresponding sync window signal is asserted. As shown in FIG. 7, the sync pattern detection signal SYNC_FOUND is only generated during a time period in which the SYNC_WIN signal is asserted. In one embodiment, the actual detection of the sync pattern is inhibited outside of the sync window SYNC_WIN. Alternatively, only the generation of the SYNC_FOUND signal is inhibited outside of the sync window SYNC_WIN, and allowed only when the SYNC_WIN signal is asserted. The sync window signal SYNC_WIN, by limiting the generation of the SYNC_FOUND signal (or limiting the detection of the sync patterns) to those portions of the sync frames where sync patterns are expected, ensures that erroneous SYNC_FOUND signals do not trigger the generation of demodulation enable signals. Indeed, should the DVD device erroneously generate a SYNC_FOUND signal within the data portion of the sync frame (bits 32 through 1487 in a 1488 bit sync frame that includes sync pattern bits 0–31 and sync frame data bits 32 through 1487), demodulation enable signals would then be generated, which demodulation signals would continue through the next sync pattern, rendering proper demodulation of the 8:16 modulated data impossible.

The sync window signal SYNC_WIN addresses not only the problem of faulty generation of SYNC_FOUND signals, but also addresses the problem associated with sync frame data portions having non-standard lengths, i.e., lengths other than the standard 1456 bits. Indeed, when the sync frame data portions have a length that is other than the standard 1456 bits, demodulation has traditionally been impossible. However, as the sync window signal SYNC_WIN includes a margin around the expected position of the SYNC_FOUND signal, detection of sync patterns following a sync frame data portion having fewer or more bits is possible. Indeed, as shown in FIG. 7, the number of bits between the first two SYNC_FOUND signals (the number of bits between the sync pattern on one sync frame and the sync pattern of the next sync frame) is the standard 1488 bits, and the first and second SYNC_FOUND signals are generated squarely in the middle of the sync window signals SYNC_WIN. However, the number of bits between the second and third SYNC_FOUND signals is 1487, or one bit less than the standard length of 1488 bits. In this case, the SYNC_WIN signal is still generated within the sync window signal SYNC_WIN. By allowing detection of the sync pattern and the generation of the SYNC_FOUND signal one bit early, demodulation signals DEMOD_EN may be correctly generated immediately following the generation of the early SYNC_FOUND signal. The aforementioned margins of the SYNC_WIN signal also allow for the detection of a sync pattern and the generation of the SYNC_FOUND signal following a sync frame data portion having a greater number of bits than the standard bit length of 1456. As shown in FIG. 7, the fourth SYNC_FOUND signal appears following a sync frame data portion fully 2 bits longer than the standard 1456 bits, thus making the interval between the SYNC_FOUND signals 3 and 4 equal to 1488 bits +2, or 1490 bits. However, as the fourth SYNC_FOUND signal is generated while the SYNC_WIN signal is still asserted, the demodulation enable signals DEMOD_EN may still be generated immediately following the late SYNC_FOUND signal, thus allowing the data portion of the following sync frame to be correctly demodulated. According to the present invention, to ensure that the demodulation enable signals DEMOD_EN do not run short of the sync pattern of the next sync frame or overrun it, a read channel bit counter accounts for the changed bit length caused by the late or early arrival of the SYNC_FOUND signal, as will be shown relative to FIGS. 8 through 12.

Figure 12:
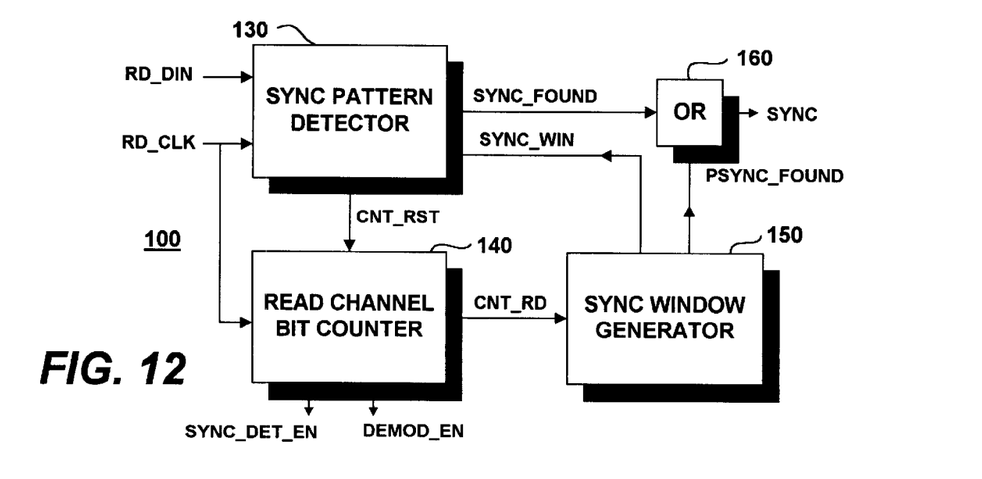
FIG. 12 is a block diagram of an improved sync pattern detection device according to an embodiment of the present invention.

FIG. 12 is a block diagram of an improved sync pattern detection circuit 100 according to an embodiment of the present invention. The Sync Pattern Detector 130 takes a read clock signal RD_CLK from a read clock (not shown) and a 4bit programmable width bus signal RD_DIN from the output of a read channel processor (not shown) of a DVD device, such as a DVD Read Only Memory (DVD-ROM) or a recordable DVD (DVD-RAM).

To generate the RD_DIN signal, the DVD-ROM or RAM is read by four laser diodes and processed by a read channel processor within the DVD device. The processed bitstream presented to the Sync Pattern Detector 130 is synchronous with the read clock signal RD_CLK and may be a 1, 2 or 4 bits in width depending on whether the DVD device is in single, dual or quad bit mode, respectively. In Single-Bit-Mode, only one of the 4 bits of the RD_DIN signal is valid and the RD_CLK signal has a frequency of 26.16 MHz. In Dual-Bit-Mode, two of the four RD_DIN bits are valid, and the frequency of the RD_CLK signal is 52.32 MHz. In Quad-Bit-Mode, all four bits of the RD_DIN signal are valid and the frequency of the RD_CLK signal is 104.64 MHz.

The RD_CLK and RD_DIN signals are input to the Sync Pattern Detector 130. The Sync Pattern Detector 130 detects the presence of any one of the eight sync patterns SYN0 to SYN7. The counter reset signal CNT_RST output from the Sync Pattern Detector 130 is input to the Read Channel Bit Counter 140 and resets the read Channel Bit Counter 140 when the Sync Pattern Detector 130 detects a sync pattern. The Read Channel Bit Counter 140 counts the read clock RD_CLK pulses and outputs a read counter signal CNT_RD. The CNT_RD signal is reset to 1 upon assertion of the CNT_RST signal and also reset after counting to 1488, marking the beginning of the data portion of the next sync frame of the current physical sector of the DVD. If the counter reset signal CNT_RST signal is delayed with respect to its expected timing (at bit 1489), the CNT_RD signal from the Read Channel Bit Counter 140 will be reset to a higher number, to account for the delay in the arrival of the SYNC_FOUND signal. The Read Channel Bit Counter 140 also outputs a sync pattern detect enable signal SYNC_DET_EN. The SYNC_DET_EN signal is related to DC component suppress Control, or DCC. DCC controls the choice of sync patterns codes from sync code tables to minimize the DC component thereof, by minimizing the absolute value of the Digital Sum Value (DSV) of the sync pattern, as is known in the DVD art. The Read Channel Counter 140 also outputs demodulation enable signals DEMOD_EN every 16 bits within the data portion of each sync frame, to enable demodulation of the encoded 8-bit data in each sync frame. Toward that end, the Read Channel Bit Counter 140 preferably outputs a DEMOD_EN signal whenever its 4 LSB are equal to 0.

The CNT_RD signal is input to the Sync Window Generator 150. The Sync Window Generator 150 generates either a sync window signal SYNC_WIN or a pseudo-sync found signal PSYNC_FOUND. The SYNC_WIN signal fed back to the Sync Pattern Detector 130 and disables the operation of the Sync Pattern Detector 130 when the SYNC_WIN signal is not asserted. Alternatively, the SYNC_WIN signal may simply prevent the generation of the SYNC_FOUND signal when the SYNC_WIN signal is not asserted. The PSYNC_FOUND signal is a pseudo sync detect signal that is generated whenever the Sync Pattern Detector 130 fails to generate a SYNC_FOUND signal when the SYNC_WIN signal is asserted. The PSYNC_FOUND signal is generated immediately after the SYNC_WIN signal is de-asserted, upon the next RD_CLK signal. The Sync Window Generator 150 does not generate the PSYNC_FOUND signal when the Sync Pattern Detector 130 outputs a SYNC_FOUND signal during the time in which the SYNC_WIN signal is asserted.

The SYNC_FOUND signal and the PSYNC_FOUND signal are input to a logic circuit 160. The logic circuit 160 outputs a SYNC signal whenever one of the two signals SYNC_WIN and PSYNC_FOUND are asserted. For example, the logic circuit 160 may implement a logical OR operation.

The present invention may advantageously be used in combination with the invention disclosed in U.S. patent application Ser. No. 09/177/450, filed on Oct. 22, 1998, now U.S. Pat. No. 6,263,469, entitled "Method And Apparatus To Reduce The Access Time Of Data From A DVD-ROM Or DVD-RAM Disk" also assigned to Oak Technology, Inc, the disclosure of which is incorporated herein by reference.

Figure 8:
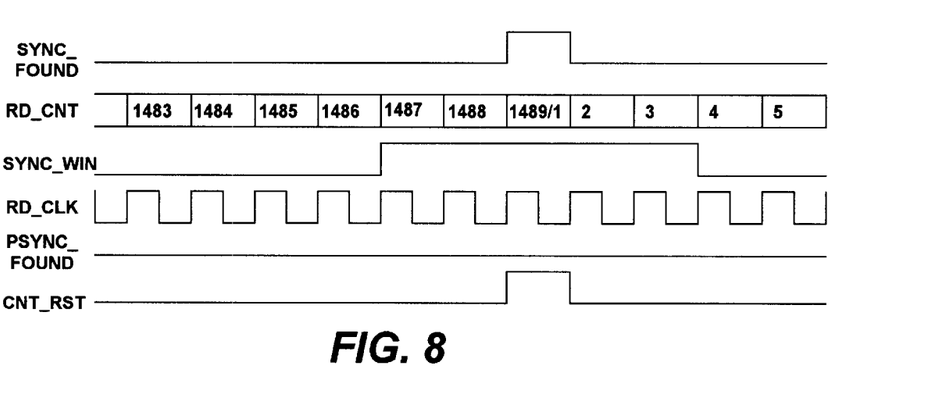
FIG. 8 is a timing diagram illustrating the operation of the method of detecting sync patterns according to an embodiment of the present invention.

Reference will now be made to each of the FIGS. 8 through 11 in turn, which illustrate the operation of the improved sync pattern detection circuit of FIG. 12 in Single-Bit Mode. FIG. 8 is a timing diagram showing the SYNC_FOUND, RD_CNT, SYNC_WIN, RD_CLK, PSYNC_FOUND and CNT_RST signals when the sync pattern is detected during normal operation, i.e., when the sync pattern is detected at bit 1489. As shown therein, the RD_CNT signal is synchronous with the read clock signal RD_CLK. The contents of the Read Channel Bit Counter 140 of FIG. 12 are shown for convenience within the RD_CNT signal.

In Single-Bit Mode, as shown in FIGS. 8 through 12, the sync window (shown as the SYNC_WIN signal) is open the equivalent of 2 bits before the expected timing of the sync detection signal SYNC_FOUND and 2 bits after the actual generation of the sync detection signal SYNC_FOUND. In a standard length sync frame, sync patterns will follow each other every 1488 bits. The expected timing of the sync detection signal SYNC_FOUND is, therefore, at CNT_RD=1489, following the least significant bit (LSB) of the sync pattern at CNT_RD=1488. As shown in FIG. 8, the SYNC_WIN signal is asserted (the sync window is opened) 2 bits before CNT_RD=1489, at CNT_RD=1487. As the sync detection signal SYNC_FOUND was generated at CNT_RD=1489, the CNT_RST signal is also asserted at CNT_RD=1489, resetting the Read Channel Bit Counter 140 of FIG. 12 to 2. The Read Channel Bit Counter 140 is reset to 2, as CNT_RD=1489 corresponds to the first bit after the LSB (CNT_RD=1488) of the previous sync pattern, and corresponds to the first bit of the first 8-bit data word to be demodulated. The SYNC_WIN signal is de-asserted (the sync window is closed) at a timing equivalent to 2 bits after the generation of the sync detect signal SYNC_FOUND, namely at CNT_RD=3. The demodulation signal DEMOD_EN would then be correctly generated every 16 bits between CNT_RD=2 and CNT_RD=1456.

Figure 9:
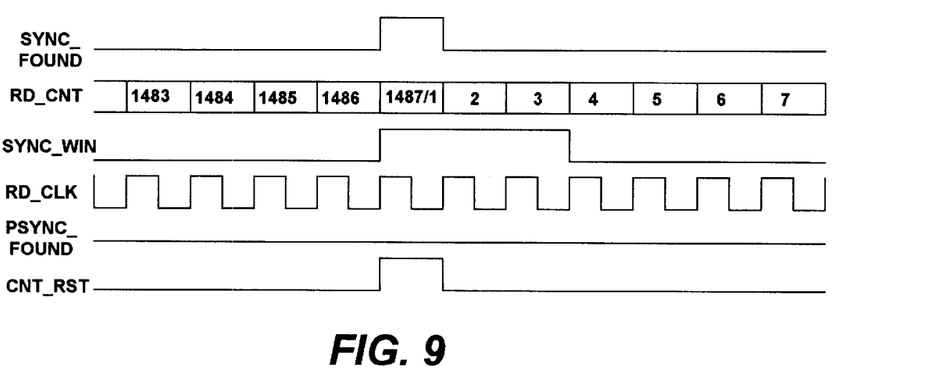
FIG. 9 is another timing diagram further illustrating the operation of the method of detecting sync patterns according to the present invention, when the bit length of the data portion of a sync frame is two bits short of its standard length of 1456 bits

FIG. 9 is a timing diagram illustrating the operation of the method and devices according to the present invention, when the sync detection signal SYNC_FOUND is generated the equivalent of 2 bits before its expected timing. For example, the data portion of the previous sync frame may have had a bit length 2 bits short of its standard length of 1456 bits. Therefore, the next sync pattern appears fully 2 bits before its expected timing of CNT_RD=1488. Similarly to the case illustrated in FIG. 8, the sync window signal SYNC_WIN is asserted the equivalent of 2 bits before the expected timing of the sync detection signal SYNC_FOUND and 2 bits after the generation of the sync detection signal SYNC_FOUND. Indeed, the SYNC_WIN signal is asserted at CNT_RD=1487, or 2 bits before the expected timing of the SYNC_FOUND signal, at CNT_RD=1489. The SYNC_WIN signal is de-asserted at CNT_RD=3, or 2 bits after the generation of the SYNC_FOUND signal at CNT_RD=1487. As the sync detection signal SYNC_FOUND was generated at CNT_RD=1487, the CNT_RST signal is also asserted at CNT_RD=1487, resetting the Read Channel Bit Counter 140 to 2. The Read Channel Bit Counter 140 is reset to 2, as CNT_RD=1487 corresponds to the first bit after the LSB (CNT_RD=1486) of the previous sync pattern, and corresponds to the first bit of the first 8-bit data word to be demodulated. The demodulation signal DEMOD_EN would then be correctly generated every 16 bits between CNT_RD=2 and CNT_RD=1456.

Figure 10:
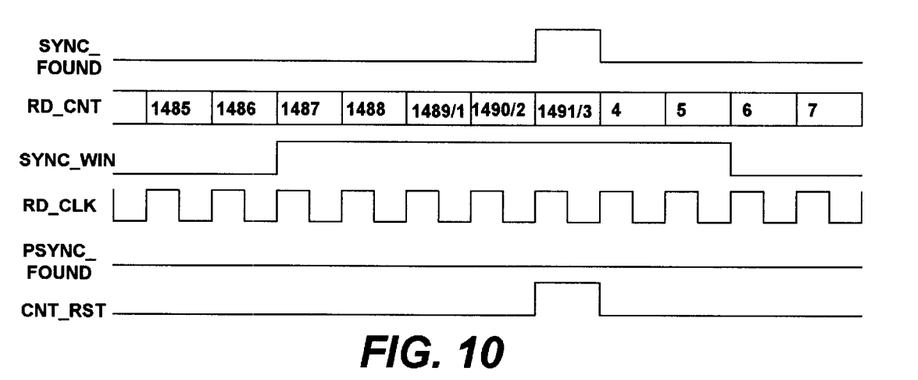
FIG. 10 is another timing diagram further illustrating the operation of the method of detecting sync patterns according to the present invention when the bit length of the data portion of a sync frame is two bits longer than the standard length of 1456 bits.

FIG. 10 is another timing diagram further illustrating the operation of the method of detecting sync patterns according to the present invention when the data portion of the sync frame is two bits longer than the standard length of 1456 bits. As shown therein, the SYNC_FOUND signal arrives at CNT_RD=1491, or 2 bits after its expected timing (at CNT_RD=1389). The sync window, however, allows for this by remaining open past CNT_RD=1490. Indeed, as is the case with FIGS. 8 and 9, the sync window signal SYNC_WIN is asserted the equivalent of 2 bits before the expected timing of the sync detection signal SYNC_FOUND and 2 bits after the actual generation of the sync detection signal SYNC_FOUND. Here, as the SYNC_FOUND signal was expected at CNT_RD=1489, the SYN_WIN signal was asserted at CNT_RD=1487. Moreover, the SYNC_FOUND signal is de-asserted 2 bits after the generation of the SYNC_FOUND signal, or at CNT_RD=5. To maintain proper timing of the demodulation enable signals DEMOD_EN, the Read Channel Bit Counter 140 was reset by the CNT_RST signal after CNT_RD=1491 to 4, to account for the late arrival of the SYNC_FOUND signal. The DEMOD_EN signals, therefore, will be generated every 16 bits, starting at CNT_RD=4 until CNT_RD=1456.

Figure 11:
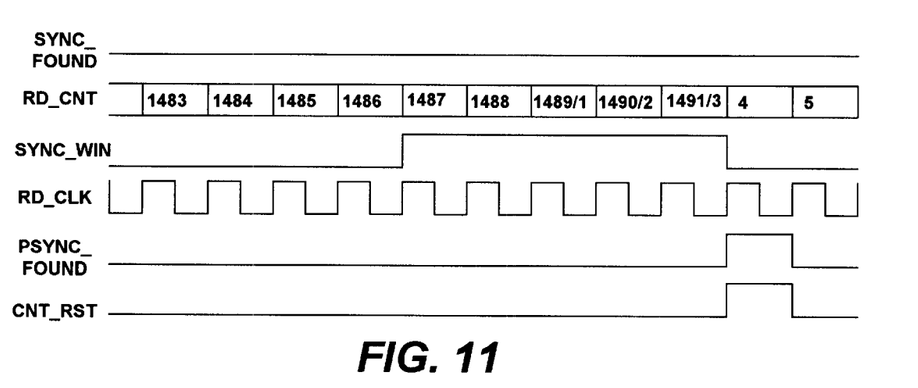
FIG. 11 is another timing diagram further illustrating the operation of the method of detecting sync patterns according to the present invention, when the sync pattern is missing from a sync frame.

In FIG. 10, had the SYNC_FOUND signal been delayed past CNT_RD=1491, the SYNC_WIN signal would have been de-asserted at CNT_RD=4. Indeed, in that case, the sync pattern would have been considered to be missing. Conventionally, successful demodulation of the sync frame data would have been impossible when preceded by a missing sync pattern. However, the present invention provides for such an occurrence and allows the demodulation pulses DEMOD_EN to be properly correctly timed and generated by the Read Channel Bit Counter 140, as illustrated in FIG. 11. As shown therein, the SYNC_FOUND signal remains de-asserted throughout the entire duration of the sync window, from CNT_RD=1487 to CNT_RD=1491. In this case also, the SYNC_WIN is asserted the equivalent of 2 bits before the expected timing of the sync detection signal SYNC_FOUND (expected at CNT_RD=1488) and 2 bits after the generation of the sync detection signal SYNC_FOUND. However, as no sync pattern is detected by the Sync Pattern Detector 130 during the interval in which the sync window remains open, a pseudo-sync signal is generated, aligned with the trailing edge of the SYNC_WIN signal, at CNT_RD=4. The Read Channel Bit Counter 140 is reset along with the generation of the PSYNC_FOUND signal, to reset the Read Channel Bit Counter 140 to 4, to take the shifted position of the PSYNC_FOUND signal relative to the expected position of the sync detection signal into account. The demodulation enable signals DEMOD_EN may then properly be generated every 16 bits, starting at CNT_RD=4. Moreover, as the Read Channel Bit Counter 140 is reset to 4, it will not overrun the next sync pattern, and will not erroneously attempt to demodulate the next sync pattern.

In Dual Bit Mode, the SYNC_WIN is asserted the equivalent of 1 bit before the expected timing of the sync detection signal SYNC_FOUND and 1 bit after the actual generation of the sync detection signal SYNC_FOUND, and the CNT_RD signal is increased by 2 for each read clock signal RD_CLK. In Quad Bit Mode, the SYNC_WIN is only asserted when the sync detection signal SYNC_FOUND is asserted and the CNT_RD signal is increased by 4 for each read clock signal RD_CLK.

Significantly, the present invention allows the accurate demodulation of 8-bit data encoded within the sync frames of the physical sectors of a DVD in a manner that is tolerant of sync frame data portions having non-standard bit lengths and tolerant of missing or corrupted sync patterns.

While the foregoing detailed description has described certain embodiments of the present invention, it is to be understood that the above description is illustrative only and not limiting of the disclosed invention. For example, other circuit configurations may be implemented to achieve a like functionality without, however, departing from the scope and spirit of the present invention. Other modifications may occur to those of skill in this art. Accordingly, the present invention to be limited only by the claims as set forth below.

What is claimed is:

1. A method of processing a DVD bitstream, comprising the steps of:

reading the DVD bitstream, the bitstream including a sync frame;

creating a sync window, the sync window being open at least during an expected timing of a sync detection signal within the sync frame;

detecting the sync pattern within the sync frame;

generating the sync detection signal only when the sync pattern has been detected and the sync window is open;

detecting a sync frame boundary;

outputting a demodulation enable signal every 16 bits after generation of the sync detection signal until the sync frame boundary is detected, and counting read channel bits of the DVD bitstream in a counter, and resetting the counter upon generation of the sync detection signal and upon reaching the sync frame boundary.

2. The method of claim 1, wherein, in single-bit mode, the sync window is open 2 bits before the expected timing of the sync detection signal and 2 bits after the generation of the sync detection signal.

3. The method of claim 1, wherein, in dual bit mode, the sync window is open 1 bit before the expected timing of the sync detection signal and 1 bit after the generation of the sync detection signal.

4. The method of claim 1, wherein, in quad-bit mode, the sync window is open only during the expected timing of the sync detection signal.

5. The method of claim 1, wherein the resetting step resets the counter to a value that accounts for a timing difference between the expected timing of the sync detection signal and a timing of the generation of the sync detection signal.

6. The method of claim 1, further comprising the step of generating a pseudo sync detection signal after the sync window closes when no sync detection signal is generated during a time when the sync window is open.

7. A DVD sync pattern detection circuit, comprising:
- a sync window generator to generate a sync window signal;
- a sync pattern detector, the sync pattern detector generating a sync detection signal only when both a sync pattern is detected in a DVD input stream and the sync window signal is asserted; and
- a read channel bit counter, the read channel bit counter generating a read counter signal to control the sync window generator and being reset when the sync pattern detector detects the sync pattern, the read channel bit counter generating a demodulation enable signal during a data portion of a sync frame when a four least significant bits of the read channel bit counter are zero.

8. The DVD sync pattern detection circuit of claim 7, wherein the sync window generator further comprises means for generating a pseudo-sync signal, the pseudo-sync signal being generated when the sync pattern detector fails to detect a sync pattern when the sync window signal is asserted.

9. The DVD sync pattern detection circuit of claim 8, further comprising a logic circuit coupled to the sync pattern detector and to the sync window generator, the logic circuit outputting a sync signal upon assertion of one of the pseudo-sync signal and the sync detection signal.

10. The DVD sync pattern detection circuit of claim 9 wherein the logic circuit includes an OR logic circuit.

11. The DVD sync pattern detection circuit of claim 7, wherein the read channel bit counter includes an 11-bit counter.

12. The DVD sync pattern detection circuit of claim 7, wherein the read counter signal controls a width of the sync window signal and wherein, in single-bit mode, the sync window signal is asserted 2 bits before an expected timing of the sync detection signal and de-asserted 2 bits after the generation of the sync detection signal.

13. The DVD sync pattern detection circuit of claim 7, wherein the read counter signal controls a width of the sync window signal and wherein, in dual-bit mode, the sync window signal is asserted 1 bit before an expected timing of the sync detection signal and de-asserted 1 bit after the generation of the sync detection signal.

14. The DVD sync pattern detection circuit of claim 7, wherein, in quad-bit mode, the sync window signal is asserted only during an expected timing the sync detection signal.

15. A DVD controller, comprising:
- means for reading a DVD bitstream;
- means for generating a sync window signal;
- means for detecting a sync pattern within the DVD bitstream, the sync pattern detecting means generating a sync detection signal only when both the sync pattern is detected and the sync window signal is asserted; and
- means for counting channel bits, the channel bit counting means generating a read counter signal to control the sync window signal generating means and resetting when the sync pattern detecting means detects the sync pattern, the channel bit counting means including means for generating a demodulation enable signal during a data portion of a sync frame when a four least significant bits of the read channel bit counting means are zero.

16. The DVD controller of claim 15, wherein the sync window signal generating means further comprises means for generating a pseudo-sync signal, the pseudo-sync signal being generated when the sync pattern detecting means fails to detect a sync pattern when the sync window signal is asserted.

17. The DVD controller of claim 16, further comprising a logic circuit coupled to the sync pattern detecting means and to the sync window signal generating means, the logic circuit outputting a sync signal upon assertion of one of the pseudo-sync signal and the sync detection signal.

18. The DVD controller of claim 15, wherein the read counter signal controls a width of the sync window signal and wherein, in single-bit mode, the sync window signal generating means asserts the sync window signal 2 bits before an expected timing of the sync detection signal and de-asserts the sync window signal 2 bits after the generation of the sync detection signal.

19. The DVD controller of claim 15, wherein the read counter signal controls a width of the sync window signal and wherein, in dual-bit mode, the sync window signal generating means asserts the sync window signal 1 bit before an expected timing of the sync detection signal and de-asserts the sync window signal 1 bit after the generation of the sync detection signal.

20. The DVD controller of claim 15, wherein, in quad-bit mode, the sync window signal generating means asserts the sync window only during an expected timing the sync detection signal.

21. A DVD bitstream processing circuit, comprising:
- a sync window signal generator;
- a sync pattern detector to detect a sync pattern within a DVD bitstream, the sync pattern detector generating a sync detection signal only when both the sync pattern is detected and a sync window signal is asserted; and
- a channel bit counter, the channel bit counter generating a read counter signal to control the sync window signal generator and resetting when the sync pattern detector detects the sync pattern, the channel bit counter generating a demodulation enable signal during a data portion of a sync frame when a four least significant bits of the read channel bit counter are zero.

22. The DVD bitstream processing circuit of claim 21, wherein the sync window signal generator further generates a pseudo-sync signal, the pseudo-sync signal being generated when the sync pattern detector fails to detect a sync pattern when the sync window signal is asserted.

23. The DVD bitstream processing circuit of claim 22, further comprising a logic circuit coupled to the sync pattern detector and to the sync window signal generator, the logic circuit outputting a sync signal upon assertion of one of the pseudo-sync signal and the sync detection signal.

24. The DVD bitstream processing circuit of claim 21, wherein the read counter signal controls a width of the sync window signal and wherein, in single-bit mode, the sync window signal generator asserts the sync window signal 2 bits before an expected timing of the sync detection signal and de-asserts the sync window signal 2 bits after the generation of the sync detection signal.

25. The DVD bitstream processing circuit of claim 21, wherein the read counter signal controls a width of the sync window signal and wherein, in dual-bit mode, the sync window signal generator asserts the sync window signal 1 bit before an expected timing of the sync detection signal and de-asserts the sync window signal 1 bit after the generation of the sync detection signal.

26. The DVD bitstream processing circuit of claim 21, wherein, in quad-bit mode, the sync window signal generator asserts the sync window only during an expected timing the sync detection signal.

* * * * *